United States Patent [19]

Moran

[11] 4,032,893

[45] June 28, 1977

[54] RECONFIGURABLE DATA BUS

[75] Inventor: Donald Martin Moran, Burnsville, Minn.

[73] Assignee: Sperry Rand Corporation, New York, N.Y.

[22] Filed: Jan. 23, 1976

[21] Appl. No.: 651,770

[52] U.S. Cl. .................. 340/166 R; 179/15 AL; 179/15 A; 340/147 C; 340/147 T
[51] Int. Cl.² .................. H04J 3/14; H04Q 9/00
[58] Field of Search ....... 340/166 R, 147 R, 147 C, 340/147 T, 172.5; 445/1; 179/15 AL, 15 A, 18 ES, 15 AT

[56] References Cited

UNITED STATES PATENTS

| | | | |
|---|---|---|---|
| 3,890,471 | 6/1975 | Hachenburg | 179/15 AL |
| 3,925,621 | 12/1975 | Collins et al. | 179/15 AL |
| 3,932,841 | 1/1976 | Deerfield | 445/1 |
| 3,963,870 | 6/1976 | Couder et al. | 179/18 ES |

OTHER PUBLICATIONS

"Universal Communication Controller Having a Tree Structure," A. Couder et al., IBM Tech. Disclosure Bulletin, vol. 18, No. 1, 6–1975, pp. 148, 149.
"Attachment Device for Interface Switch Unit," J. R. Carthew, IBM Tech. Disclosure Bulletin, vol. 12, No. 12, May 1970, pp. 2251, 2252.
"Input/Output Module," E. J. Annunziata et al., IBM Tech. Disclosure Bulletin, vol. 14, No. 1, June 1971, pp. 264–268.

*Primary Examiner*—Donald J. Yusko
*Attorney, Agent, or Firm*—William D. Bauer; Thomas J. Nikolai; Marshall M. Truex

[57] ABSTRACT

A digital data communication system having a plurality of digital nodal communication devices interconnected by a digital data bus in a fixed physical manner in which the data bus structure may be electrically reconfigured without physical modification of the digital data bus. The ability to reconfigure the digital data bus is accomplished by the insertion of a digital reconfigurable data bus module into the position on the digital data bus previously held by one of the digital nodal communication devices and the connection of the replaced digital nodal communication device to the digital reconfigurable data bus module. The digital reconfigurable data bus module contains a transceiver mechanism capable of receiving and transmitting digital information to and from the digital data bus, an adapter mechanism for communicating with the replaced digital nodal communication device and a switching mechanism capable of the multiple switching of data from the adapter section which is connected to the replaced digital nodal communication device to the transceiver section which is connected to the digital data bus.

The digital reconfigurable data bus module allows a fixed configuration of nodal devices and connecting devices to provide the function of tree structured buses, ring structured buses, dedicated channels or combinations of any of them. The module facilitates the receipt, switching and retransmission of data on any selected bus pattern.

8 Claims, 12 Drawing Figures

A- DIGITAL NODAL COMMUNICATION DEVICE

A- DIGITAL NODAL COMMUNICATION DEVICE
B- DIGITAL RECONFIGURABLE DATA BUS MODULE

ADAPTER MECHANISM

DEDICATED CHANNEL

TREE #1

TREE #2

RING #1

RING #2

RECONFIGURABLE DATA BUS

BACKGROUND OF THE INVENTION

Previous digital communication systems either provided for a fixed configuration of bus structure or provided an external manual switching mechanism. The fixed configurations suffer the disadvantage of being very restrictive. Data communications between devices in this type of network are restricted to a single bus structure unless resort is made to expensive, time consuming system cable reconnections. The communication systems utilizing external switching also suffer from being very expensive and also from being very bulky. The external switches in these type of systems may very well be larger than the equipment which they are switching.

The purpose of the digital reconfigurable data bus module is to provide data communication among digital equipments such as computers, memories, displays, sensors or peripherals in a fixed physical structure but in a reconfigurable electronic bus structure. The significant advantage of the digital reconfigurable data bus module then is to provide for this restructuring without any physical change in cabling or externally initiated switching. Previous data buses provided the characteristics of only one type of structure without physical changes in cabling or externally initiated switching.

Several previous communication systems disclose the ability to connect and reconnect different devices to one another. For example, U.S. Pat. No. 3,024,418 shows a selective coupling apparatus for use in connecting several utilization devices to a single signal source. However, here the device allows the reconnection of the multiple utilization devices in only one bus configuration, in this case a tree structured bus. Also, U.S. Pat. No. 3,399,380 discloses an interconnection network in the nature of a crosspoint switch. However, the unit connection network provides only switching means and more importantly only a single point switching means for interconnecting any of a first set of terminals to any of a second set of terminals and does not provide the capability of switching bus configurations, since more than a single point switch is required.

Several previous communication systems describe combination loop and serial communication means, for example U.S. Pat. No. 3,742,144 discloses an interconnected loop digital transmission system to which means are provided for switching between multiple system loops. However, in this system the bus structure is fixed in a multiple loop configuration and cannot be changed. The only switching involved is switching between already-existing loops. Also, U.S. Pat. No. 3,879,582 shows a loop digital data communication system. However, again the bus configuration is fixed in the established loop configuration. U.S. Pat. No. 3,904,829 discloses a demand driven multiplexing system which provides a combination closed loop communication link along with a serially arranged communication link. However, although both loop and serial configurations are disclosed in one communication system, there exists no method of changing the loop and serial systems. Again, the bus structure is fixed. Previous communication systems also utilized the ability to insert different types of data processing units in one communication loop. In U.S. Pat. No. 3,879,582 a loop controller is inserted in the loop in order to control the data processing function. The loop controller, however, provides merely basic timing and delay functions and does not significantly alter data format.

SUMMARY OF THE INVENTION

The present invention involves the insertion of a digital reconfigurable data bus module into the position on a digital data bus, in a digital data communication system having a plurality of digital nodal communication devices interconnected by digital data bus in a fixed physical manner, previously held by one of the digital nodal communication devices. The digital reconfigurable data bus module includes a set of communication ports capable of receiving and transmitting digital information to and from the digital data bus, a set of communication ports capable of digital data communication to and from the replaced digital nodal communication device and a switching mechanism capable of the multiple switching of data from the one set of communication ports to the other set of communication ports. The module facilitates the receipt, switching and retransmission of data on a selected bus pattern.

The digital reconfigurable data bus module consists of three major parts: a transceiver mechanism; a switching mechanism, and an adapter mechanism.

The transceiver mechanism functions between the communication ports to which the digital data bus is connected and the switching mechanism. The transceiver mechanism drives and terminates each line of the digital data bus and makes any necessary conversions between line signals and logic level signals within the digital reconfigurable data bus module.

The switching mechanism provides selective signal paths between the transceiver mechanism and the adapter mechanism. Two connection modes are possible: the first mode is a one to one connection between the output of any transceiver or adapter mechanism and the input of any such mechanism. The second mode is a many to many connection where the output of each transceiver or adapter mechanism in a given reconfigurable data bus module can be connected to the input of each of the other transceiver or adapter mechanisms in that module, but not to its own input. The second mode is utilized in tree structured buses.

The adapter mechanism consists of three major sections: an access, a control and an interface section. The access section performs any data conversion which is necessary, such as serial to parallel conversion, PCM encoding and decoding, timing generation, timing recovery and other required functions such as error coding and detection. The control section establishes the data bus protocol which is to be used for communication over the digital data bus. The interface section adapts the reconfigurable data bus module to the port utilized by the replaced digital nodal communication device.

OBJECTS

It is an object of the present invention to provide for a multitude of bus configurations with a given set of digital nodal communication devices and interconnecting devices (cables) as for example, tree structured buses, ring structured buses, dedicated channels or combinations of any of them.

It is a further object of the present invention to provide for the capability of changing between the various bus configurations dynamically and without physical changes in cabling or external switching.

It is a further object of the present invention to provide for the receipt and retransmission of data, as for example conversion from serial to parallel and again from parallel to serial among several different types of devices such as computers, memories, displays, sensors or periphals.

BRIEF DESCRIPTION OF THE DRAWINGS

The foregoing objects, advantages, construction and operation of the present invention will become more readily apparent from the following description and accompanying drawings in which.

DESCRIPTION OF THE PREFERRED EMBODIMENT

Figure 1:
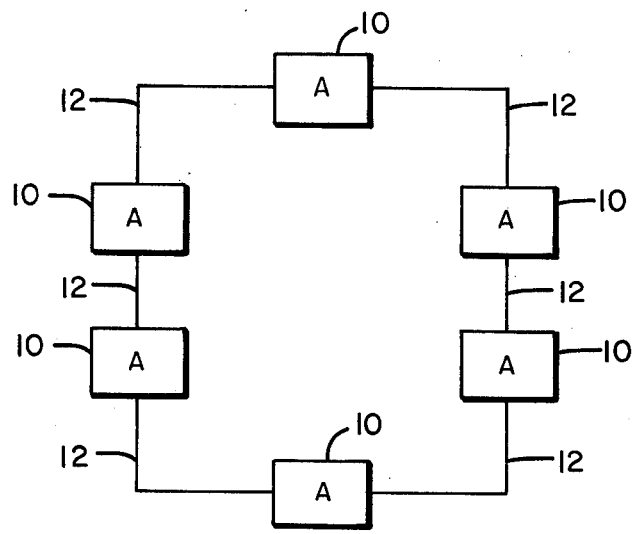
FIG. 1 illustrates a typical prior art communication system.

In a typical prior art digital communication system as shown in FIG. 1, a plurality of digital nodal communication devices 10 are interconnected by digital data bus 12 in some fixed and solely manually alterable manner. In this particular case the interconnection of the digital data bus 12 between the digital nodal communication devices 10 represents a ring or loop bus structured system. While the ring or loop bus structure may be adequate for some communication tasks, the loop structure may be inadequate for other communication tasks. If a different bus structure were required in the communication system shown in FIG. 1, it would be necessary to physically move and manually reconnect the digital data bus 12 in some other desired physical arrangement.

Figure 2:
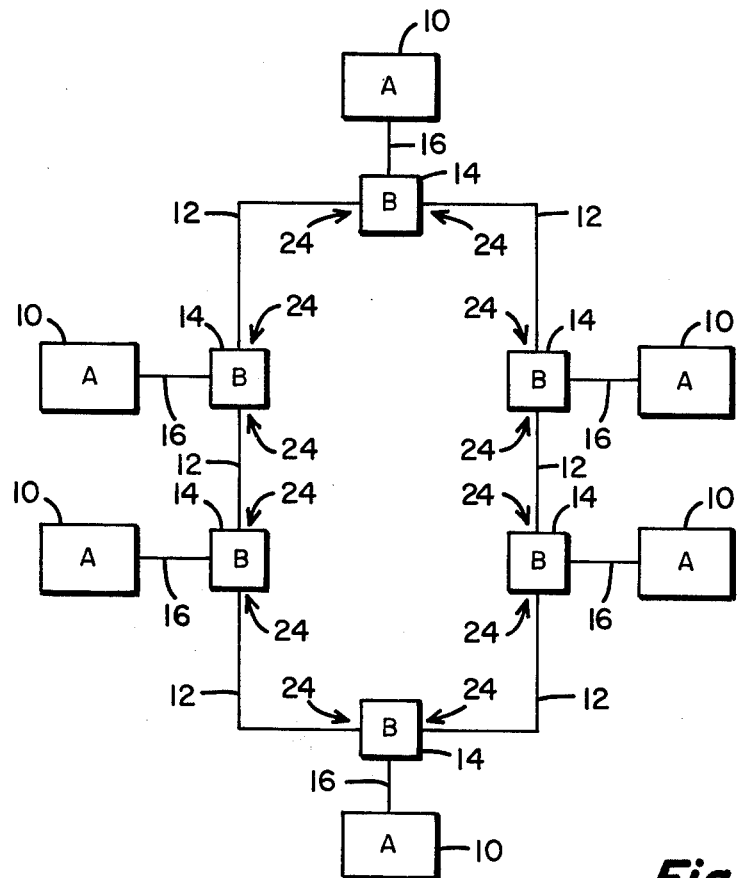
FIG. 2 illustrates by means of a block diagram the system arrangement in which the present invention is implemented.

Instead of connecting the digital nodal communication devices 10 directly to the digital data bus 12 as shown in FIG. 1, the present invention contemplates the connection of the digital nodal communication devices 10 to the digital data bus 12 through another electronic device hereinafter referred to as a digital reconfigurable data bus module 14 as shown in FIG. 2. Here, the digital reconfigurable data bus modules 14 occupy the positions on the digital data bus 12 previously held by the digital nodal communication devices 10 (FIG. 1). The digital nodal communication devices 10 are then connected to the digital reconfigurable data bus modules 14 by way of an interface bus 16. All communication between digital nodal communication devices 10 must be accomplished by way of at least one digital reconfigurable data bus module 14.

The digital reconfigurable data bus modules 14 shown in FIG. 2 each have one digital nodal communication device 10 connected to it by way of an interface bus 16. However, this is for purposes of illustration only. In practice, each digital reconfigurable data bus module 14 may have connected to it a plurality of digital nodal communication devices 10 by way of a plurality of interface buses 16. If this were the case, each digital nodal communication device 10 could communicate with the digital reconfigurable data bus module 14 on a separate input/output channel as is common on many digital computer systems.

Each digital reconfigurable data bus module 14 (hereinafter referred to as RDB module) shown in FIG. 2 has the digital data bus 12 connected to it in two places, that is, each digital RDB module 14 contains two digital data bus communication ports 24. However, the two data bus communication ports 24 are shown in FIG. 2 for illustrative purposes only. In practice, each digital RDB module 14 may contain a plurality of digital data bus communication ports 24 and have a plurality of digital data base 12 connected to it. This connection would be necessary in other types of data bus structures, as for example tree structured buses.

Figure 3:
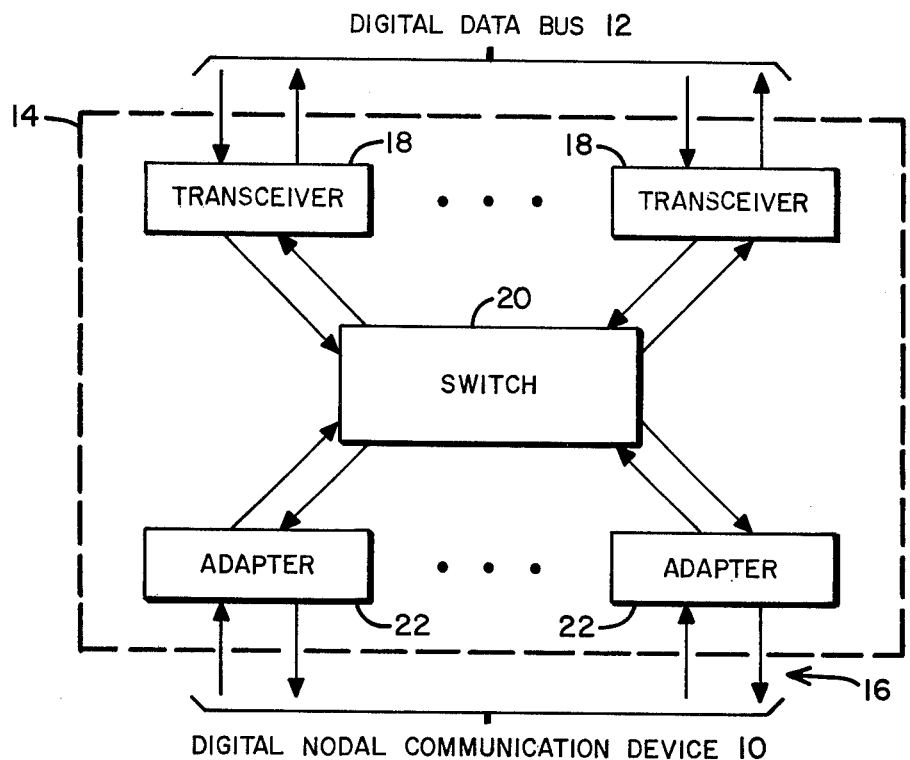
FIG. 3 is a block diagram of the digital reconfigurable data bus module.

The internal composition of each digital RDB module 14 is illustrated in FIG. 3. As can be seen in this figure, typical digital data bus 12 connections are made at the top of the diagram and digital nodal communication device 10 connections are made through the interface bus 16 at the bottom of the diagram.

Referring to FIG. 3, each digital RDB module 14 includes three basic, separate types of mechanisms: a transceiver mechanism 18, a switch mechanism 20, and an adapter mechanism 22. Each digital RDB module 14 must contain at least one of each of the three types of mechanisms; however, each digital RDB module 14 may contain a plurality of transceiver mechanisms 18 and a plurality of adapter mechanisms 22. A plurality of transceiver mechanisms 18 would allow the connection of a plurality of digital data buses 12 to a single digital RDB module 14. A plurality of adapter mechanisms 22 would allow the connection of a plurality of digital nodal communication devices 10 to a single digital RDB module 14. The transceiver mechanism 18 drives and terminates each digital data bus line and makes any conversion necessary between line signals and logic level signals within the digital RDB module 14. The switch mechanism 20 provides selective signal path between the various transceiver mechanisms 18 and the adapter mechanisms 22. The adapter mechanism 22 performs any necessary data conversion, any necessary encoding/decoding, timing generation and recovery, implements the data bus protocol and adapts the data signals to the interface required by the digital nodal communication device 10 to which it is connected.

Each transceiver mechanism 18 drives and terminates the digital data bus 12 to which it is connected and makes any necessary conversion between the digital data bus signals and the logic level signals required within the digital reconfigurable data bus module 14. There are many different types of transceiver mechanisms available which would accomplish this required function and they are well known within the prior art. For example, a transceiver mechanism could operate in parallel fashion or in serial fashion and could operate in duplex mode or simplex mode. For this particular embodiment, a serial transceiver mechanism is envisioned which is capable of simultaneously transmitting and receiving serial bit streams of data with an arbitrary format. A transceiver mechanism suitable for use in the RDB module of this invention is described in U.S. Pat. No. 3,863,220, Osawa, et al, LOOP TYPE DATA HIGHWAY SYSTEM FOR DATA TRANSMISSION.

Figure 4A:
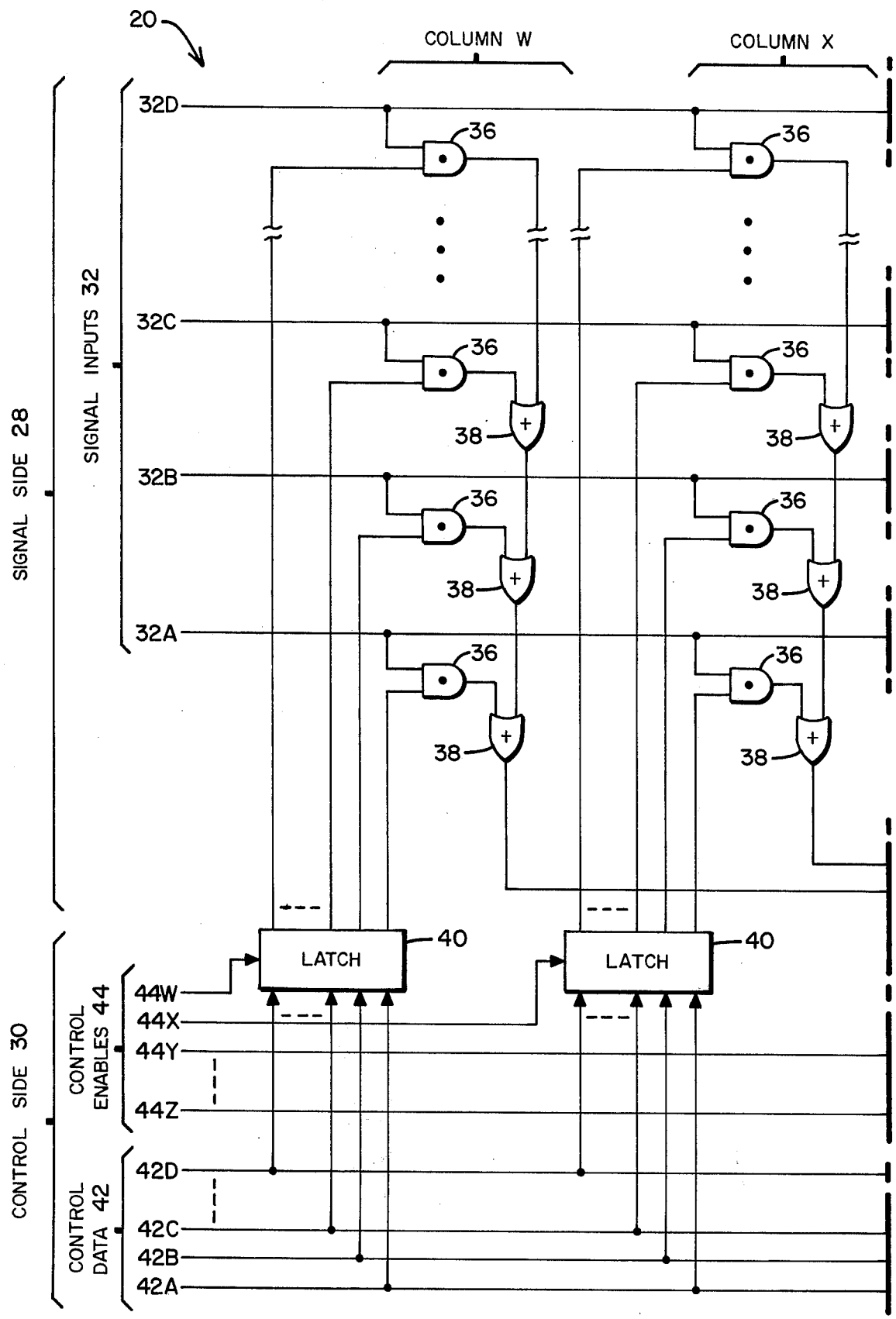
FIG. 4 is a block diagram of the switching mechanism used in FIG. 3.
Figure 4B:
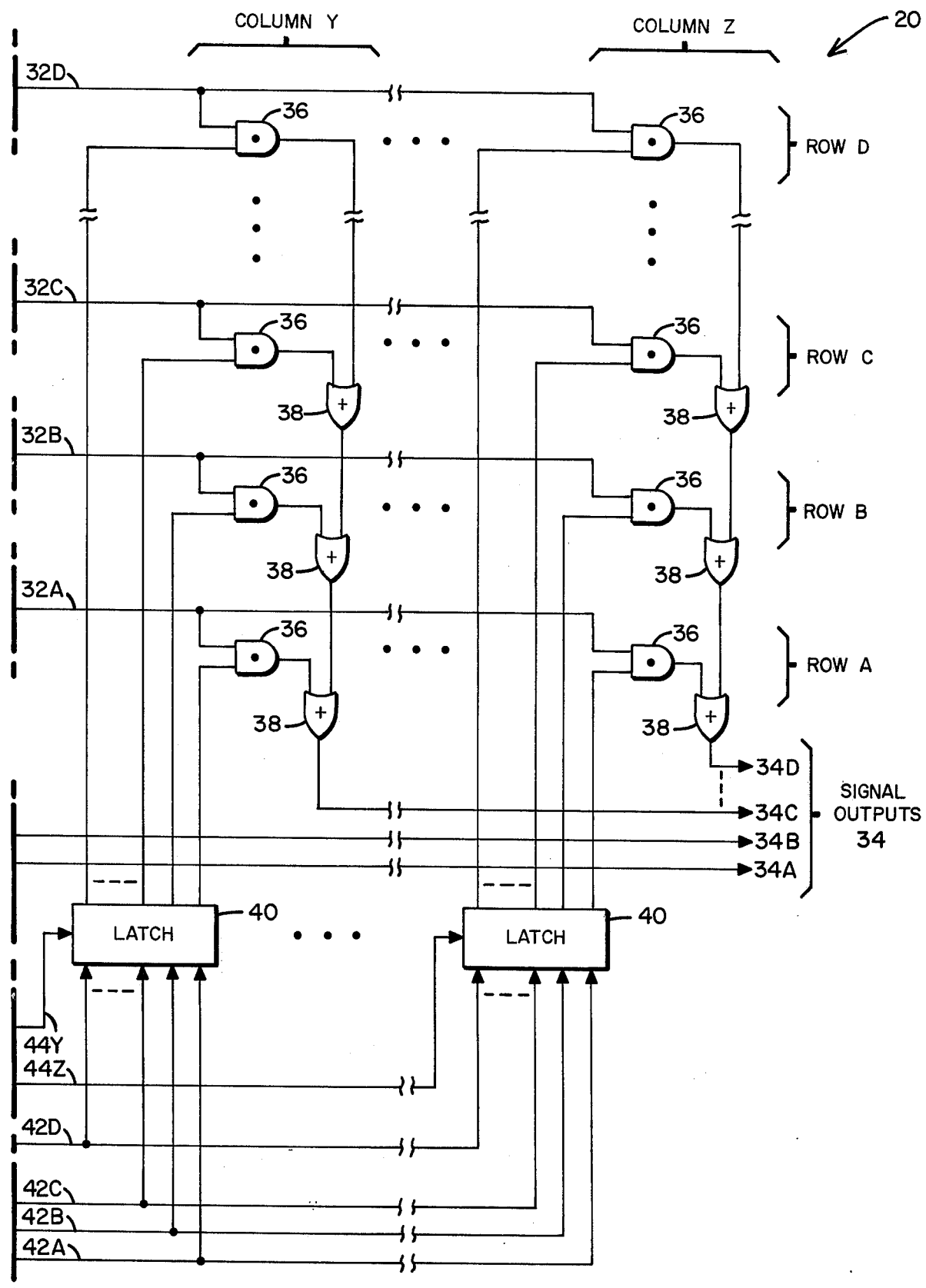

The switch mechanism 20 contained within the RDB module provides selective data paths between the various transceiver mechanisms 18 and the adapter mechanisms 22. As there may be present more than one transceiver mechanism 18, and adapter mechanism 22 in each digital RDB module 14, a multiple input switch mechanism 20 is required. One input to the switch mechanism 20 is required for each adapter mechanism 22 and transceiver mechanism 18. An N-input switch mechanism is illustrated in FIG. 4. This typical switch mechanism 20 is a four-input device. As shown in FIG. 4, the switch mechanism 20 consists of a signal side 28 and a control side 30. The signal side 28 contains all of the data paths present in the switch mechanism 20. The control side 30 is responsible for controlling which switch connections are completed.

The signal side 28 of the switch mechanism 20 will be described first. The signal side 28 contains four signal inputs 32 and four signal outputs 34. For convenience, all of the signal inputs 32 are grouped together at one location on the drawing and all of the signal outputs 34 are grouped together at another location on the drawing. In operation, in the digital RDB module 14, signal input 32A and signal output 34A would constitute one two-way data path to and from the switch mechanism 20. To this path would be connected either a transceiver module 18 or an adapter module 22. Similarly, signal input 32B and signal output 34B are grouped together as are signal input 32C and signal output 34C and also signal input 32D and signal output 34D. The signal side 28 of the switch mechanism 20 contains an N × N matrix of AND gates 36, in this case a 4 × 4 matrix. These 16 AND gates 36 are grouped into a matrix consisting of four columns and four rows. For convenience, the columns will be referred to as W, X, Y and Z and the rows will be referred to as A, B, C and D. Thus, any reference to an AND gate 36 of a particular column and a particular row will refer to one particular AND gate 36. Each signal input 32 is connected to one side of each AND gate 36 in a particular row. As illustrated, signal input 32A is connected to all of the AND gates 36 in row A; similarly, signal input 32B is connected to all of the AND gates 36 in row B; signal input 32C is connected to all of the AND gates 36 in row C, and signal input 32D is connected to all of the AND gates 36 in row D.

The second side, and only other side, of the AND gates 36 is connected to the output of separate bit positions in a series of latches 40. Each N-bit latch 40 is connected to one column of AND gates 36. The first bit position in latch 40 is connected to the second side of the AND gate 36 for row A in a given column; the second bit position in the same latch 40 to the second side of AND gate 36 in row B of the same column, etc. The output of the AND gates 36 for a particular column are connected to a series of OR gates 38 such that a signal present at the output of any one of the AND gates 36 will cause a signal to appear on the output of the series of OR gates 38. In this case the output of the AND gate row 36 located in row D and the output of AND gate 36 located in row C are connected to the input of one OR gate 38 whose output is connected to a second OR gate 38 whose other input is AND gate 36 from row B. The output of that OR gate 28 is connected to the input of another OR gate 38 whose other input is the output of AND gate 36 located in row A. The output of that OR gate 38 is connected directly to the signal output 34.

Alternatively, instead of utilizing the series of OR gates described in the previous paragraph and illustrated in FIG. 4, two other configurations of "OR"ing mechanisms are envisioned. In the first, a single N-input OR gate is utilized for each column. The output of each of the AND gates 36 for a particular column are connected individually to the inputs of the single OR gate. The output of the single OR gate is connected directly to the output signal 34. In the second, the logical "Wired-OR" function is utilized. Logical NAND gates would be utilized in place of the AND gates 36 illustrated in FIG. 4. The outputs of all of the NAND gates for a particular column are connected directly together. This creates a "Wired-OR" condition since (using positive logic) a low voltage represents a true signal and a true signal present at the output of any one of the NAND gates will pull the voltage low (a true signal). The outputs of the NAND gates are also connected to a single input NOT gate (inverter) to convert the signal back to a high voltage level output. The output of the NOT gate is connected directly to the signal output 34.

The group of signals collected from column W becomes the signal output 34A. Similarly, the signal collected from the group of gates from column X becomes signal output 34B. The signal collected from the group of gates in column Y becomes signal output 34C, and the signal collected from the group of gates in column Z becomes signal output 34D. In this manner and arrangement, the switch connections are established by the signals present in the latch positions in all of the latches 40. It can be readily seen that any of the signal inputs 32 may be connected to any of the signal outputs 34 in a single or a multiple fashion.

The control side 30 of the switch mechanism 20 establishes which switch connections will be completed. This is accomplished by the loading of the latches 40 with the appropriate signal, that is, a binary 1 is loaded into a given latch position in the latches 40 in order to enable the particular AND gate 36 on the signal side 28. The loading of these latches 40 is accomplished by N control enables 44. The latch 40 controlling column W AND gates 36 is loaded by control enable 44W. Similarly, latch 40 which controls AND gates 36 in column X is loaded by control enable 44X, etc. A common data bus for all of the latches 40 is established with N control data lines 42. Control data line 42A controls the bit position in the latches 40 which controls the AND gates 36 associated with row A. Similarly, control data line 42B controls the bit position in the latches 40 which controls the AND gates 36 associated with row B, etc. In this manner, multiple bits in the latches 40 may be set to a binary 1 in order to enable a single point switch connection or a multiple switch connection.

Figure 5:
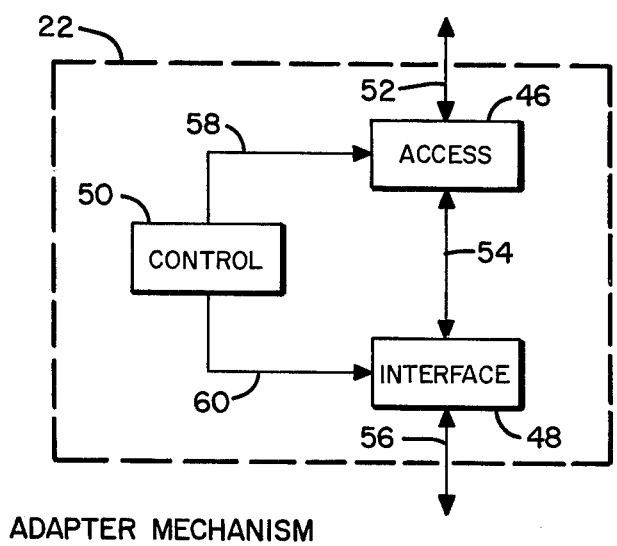
FIG. 5 is a block diagram of the adapter mechanism of FIG. 3.

Referring to FIG. 5, each adapter mechanism 22 includes an access mechanism 46, an interface mechanism 48 and a control mechanism 50. The access mechanism 46 communicates with the switch mechanism 20 by way of data path 52 and communicates with the interface mechanism 48 by way of data path 54. The interface mechanism 48 then further communicates with the interface bus 16 by way of data path 56. The control mechanism 50 operates on the access mechanism 46 and the interfere mechanism 48 by the control lines 58 and 60.

The access mechanism 46 performs any necessary data conversion, any necessary data encoding and decoding, timing generation and recovery and performs other functions such as error encoding and detection. The access module 46 in the preferred embodiment converts the serial data obtained from the digital data bus 12 through the transceiver mechanism 18 and switch mechanism 20 to parallel data. Of course, any sort of data conversion as is necessary could be performed in this mechanism and no particular version is required by the present invention. If the digital nodal communication device 10 operates on exactly the same data mode encoding as is present on the digital data bus 12, data conversion encoding and decoding would not be required. The serial to parallel data conversion shown allows the digital nodal communication device 10 to operate on a parallel data format while simplifying the digital data bus 12 and the switch mechanism 20 since a set of data lines and switches for each parallel bit are not required. Any of a number of data conversion devices well known in the art may be used. A suitable device for accomplishing the serial to parallel data conversion and for data encoding and decoding is disclosed in U.S. Pat. No. 3,863,220, Osawa, et al, LOOP TYPE DATA HIGHWAY SYSTEM FOR DATA TRANSMISSION.

The interface mechanism 48 is present in order to convert the data from the access mechanism 46 to the line signals and logic levels required by the digital nodal communication device 10 to which it is connected by way of the data path 56 and the interface bus 16. Devices needed, if any, to perform this conversion are well known in the art.

The control mechanism 50 implements any data bus protocol by generating and receiving appropriate messages, interprets any control messages and controls the access mechanism 46 and the interface mechanism 48. Again, the control mechanism 50 may take many forms, depending upon the form of the data and encoding format used on the digital data bus. Typically, any form of data bus protocol usable without the digital reconfigurable data bus module 14 can be utilized within such module 14. A suitable device implementing a typical data bus protocol and interpreting and sending control messages is disclosed in U.S. Pat. No. 3,863,220, Osawa, et al, LOOP TYPE DATA HIGHWAY SYSTEM FOR DATA TRANSMISSION.

Figure 6:
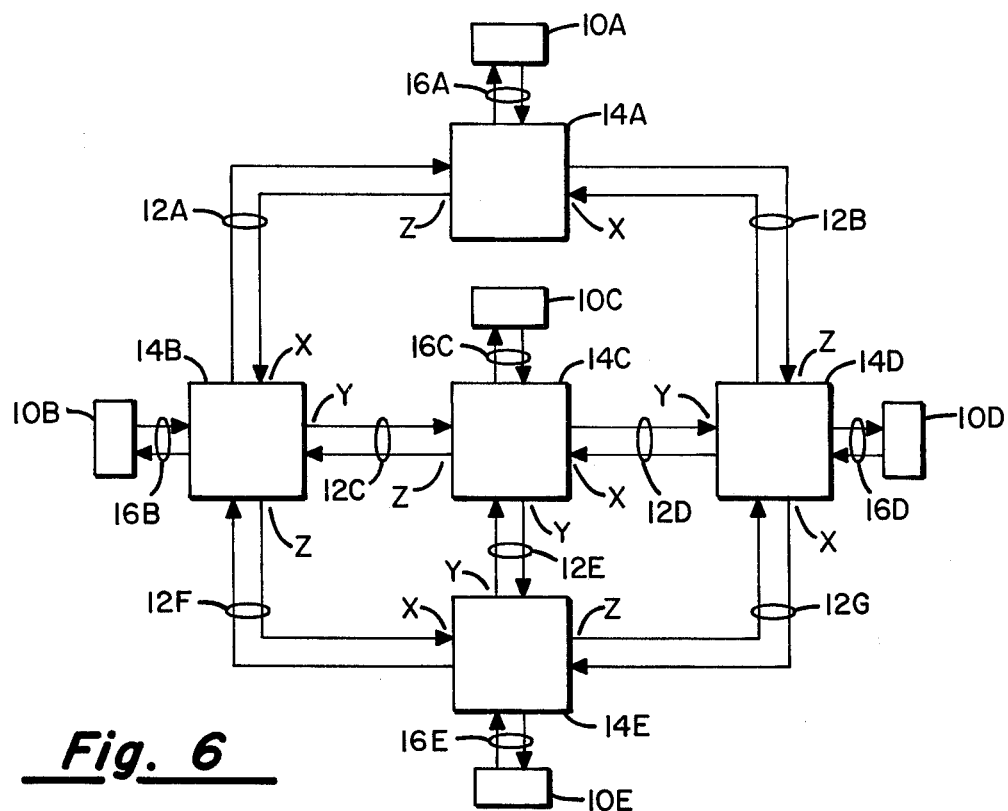
FIG. 6 describes an exemplary communication system employing the invention.

Consideration will now be given to the digital reconfigurable data bus module 14 operation in a typical digital communication system. An example communication system is illustrated in FIG. 6. In this example communication system, a total of five digital nodal communication devices 10A through 10E are shown. Each of these digital nodal communication devices 10 are connected to a digital reconfigurable data bus module 14 by way of an interface bus 16. For clarity of illustration, the interface bus 16 is depicted as a single two-way bus. It is recognized, that the interface 16 may actually consist of multiple communication paths where more than one communication path are desired or required in a given communication system. All of the digital reconfigurable data bus modules 14A through 14E have three digital data bus communication ports, except digital reconfigurable data bus module 14A which has only two communication ports. A total of seven digital data bus links 12A through 12G connect the digital reconfigurable data bus modules. Digital data bus (hereinafter referred to as DDB) 12A connects port Z of RDB module 14A with port X of RDB module 14B. DDB 12B connects port X of RDB module 14A with port Z of RDB module 14D. DDB 12C connects port Y of RDB module 14B with port Z of RDB module 14C. DDB 12D connects port X of RDB module 14C with port Y of RDB module 14D. DDB 12E connects port Y of RDB module 14C with port Y of RDB module 14E. DDB 12F connects port Z of RDB module 14B with port X of RDB module 14E. Finally, DDB 12G connects port X of RDB module 14D with port Z of RDB module 14E.

This exemplary communication network, shown in FIG. 6, will be used throughout the subsequent discussion illustrating the various data bus structures which may be implemented without modifying the physical digital data bus connections.

Figure 7:
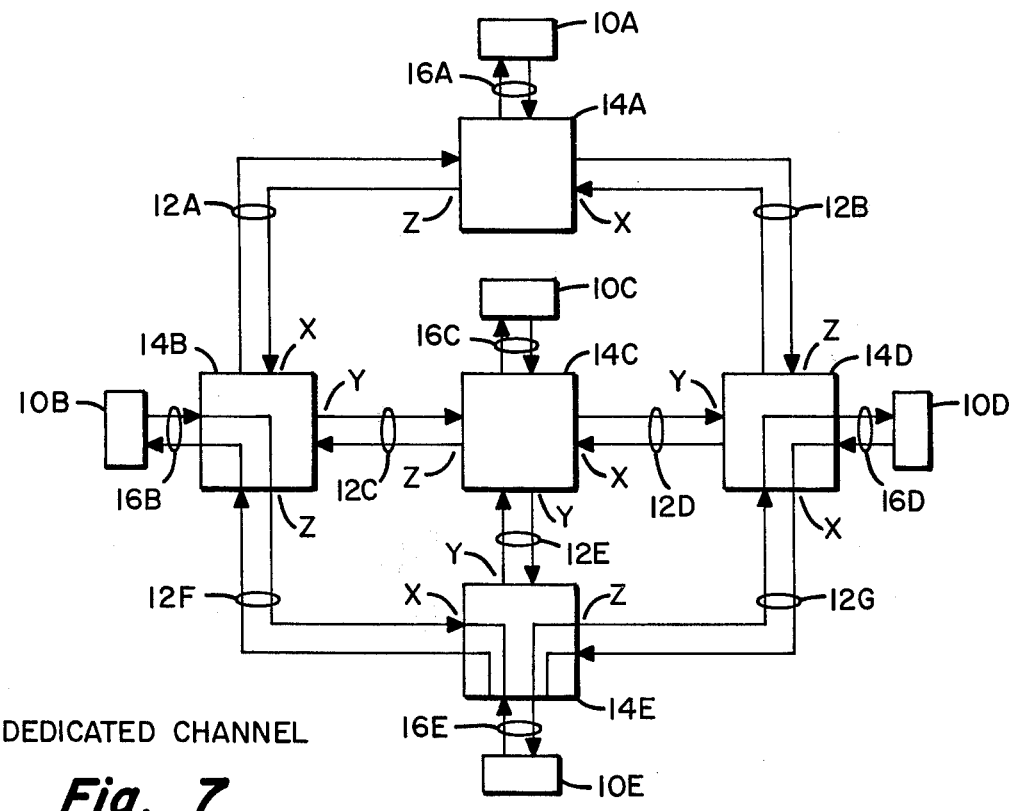
FIG. 7 illustrates the use of the invention in a dedicated channel.

FIG. 7 illustrates how the example communication system utilizing the digital RDB module 14 may be utilized with a bus structure in the nature of a dedicated channel. In FIG. 7, the digital nodal communication device 10E is connected to the digital nodal communication device 10B on one channel and to digital nodal communication device 10D on a second channel. In order to accomplish this result, four separate connections are made within the digital RDB module 14E, as well as two separate connections within each of the two RDB modules 14B and 14D. In RDB module 14E the interface bus 16E is connected within the RDB module 14E to communication port X. This establishes a communication path through DDB 12F to port Z of RDB module 14B. A connection inside RDB module 14B connecting port Z with interface bus 16B completes the data path for the first dedicated channel. The interface bus 16E of RDB module 14E is connected to port Z which establishes a communication path through DDB 12G to port X of RDB module 14D. It is recognized that interface bus 16E must consist of two two-way communication paths, one for each dedicated channel. A connection inside RDB module 14D between port X and interface bus 16D completes the other dedicated channel. Thus, the example communication system's bus may be structured by the RDB modules 14 into a dedicated channel bus structure.

Figure 8:
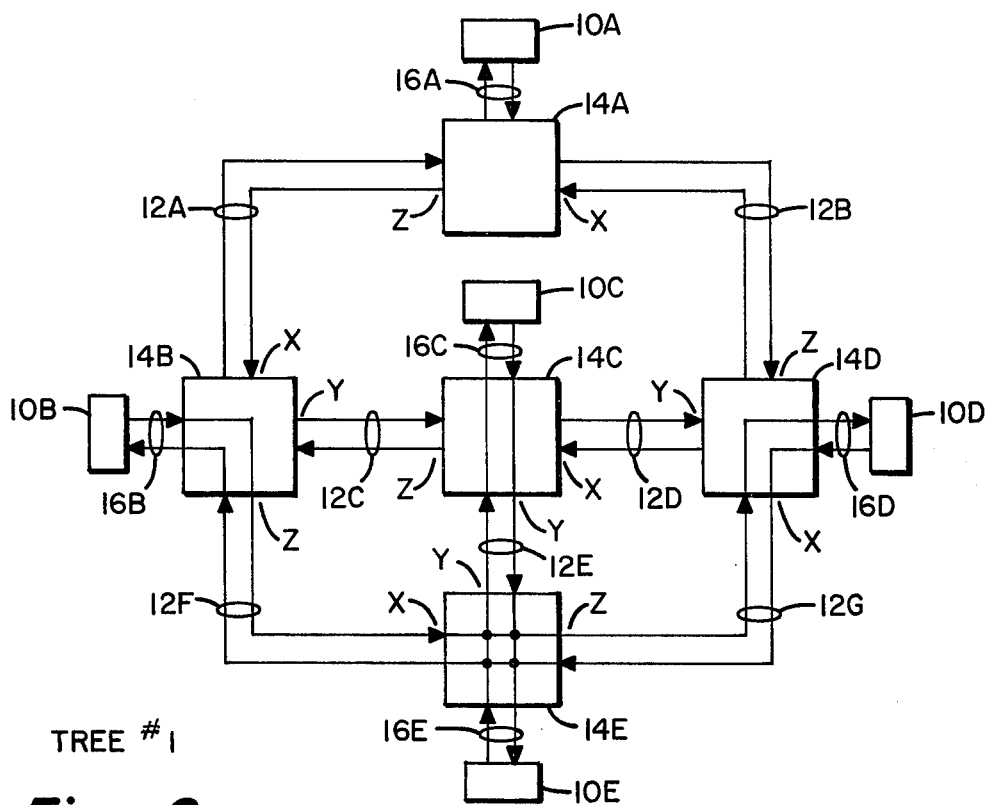
FIGS. 8 and 9 illustrate reconfiguration into various tree networks.

To illustrate the example communication system's bus structured in a tree arrangement, reference is made to FIG. 8. Here digital nodal communication device 10E is connected to digital nodal communication devices 10B, 10C and 10D, all on one channel. Also note that digital nodal communication devices 10B, 10C and 10D may communicate with each other without the necessity of communicating through digital nodal communication device 10E. This is accomplished by establishing communication paths through RDB module 14E such that communication may occur between communication ports X, Y and Z of RDB module 14E without disturbing interface bus 16E or digital nodal communication device 10E. In this arrangement, interface bus 16E in RDB module 14E is connected to all three communication ports X, Y and Z. For simplicity and ease of illustration, these connections are shown in FIG. 8 as a typical crosspoint switch arrangement with a connection at every intersection. It is to be understood, however, that the switch mechanism 20 illustrated in FIG. 4 is to be utilized. The connections illustrated in RDB module 14E in FIG. 8 are to be interpreted in light of the switch mechanism 20 illustrated in FIG. 4. The switch connections are to be interpreted, in this FIG. 8 and all subsequent figures, as having made a logical connection between the RDB module 14 input and the connected RDB module 14 outputs if any, but not to its own output. These four particular switch connections in RDB module 14E of FIG. 8 illustrate that the RDB module 14E input from interface bus 16E is logically connected to the RDB module 14E outputs at ports X, Y and Z; that the RDB module 14E input at port X is logically connected to the RDB module 14E outputs at ports Y, Z and interface bus 16E; that the RDB module 14E input at port Y is logically connected to the RDB module 14E outputs at ports X, Z and interface bus 16E; and that the RDB module 14E input at port Z is logically connected to the RDB module 14E outputs at ports X, Y and interface bus 16E. Single connections are made within each of the other three RDB modules involved, 14B, 14C and 14D. In RDB module 14B, interface bus 16B is connected to communication port Z; in RDB module 14C, interface bus 16C is connected to communication port Y; in RDB module 14D, interface bus 16D is connected to communication port X. By this arrangement, digital nodal communication device 10E communicates with digital nodal communication device 10B by way of DDB 12F, communicates with digital nodal communication device 10C by way of DDB 12E and communicates with digital nodal communication device 10D by way of DDB 12G.

Figure 9:
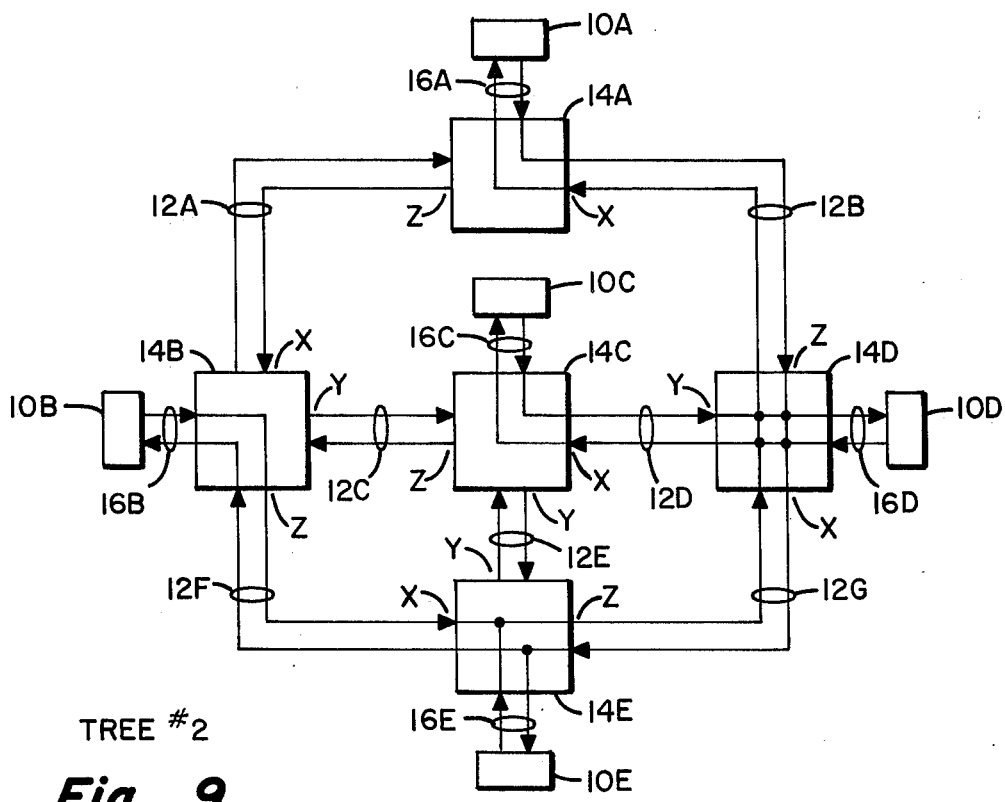

Of course, various other tree structured bus networks may be developed in a similar manner. In FIG. 9 digital nodal communication device 10D communicates with digital nodal communication device 10A on one leg, digital nodal communication device 10C on a second leg, and digital nodal communication devices 10B and 10E on the third leg. Also note that digital nodal communication devices 10A, 10B, 10C and 10E may communicate with each other without the necessity of communicating through digital nodal communication device 10D. Connections within each digital reconfigurable data bus module 14 are similar to those described in the first tree saturated bus network illustrated in FIG. 8.

Figure 10:
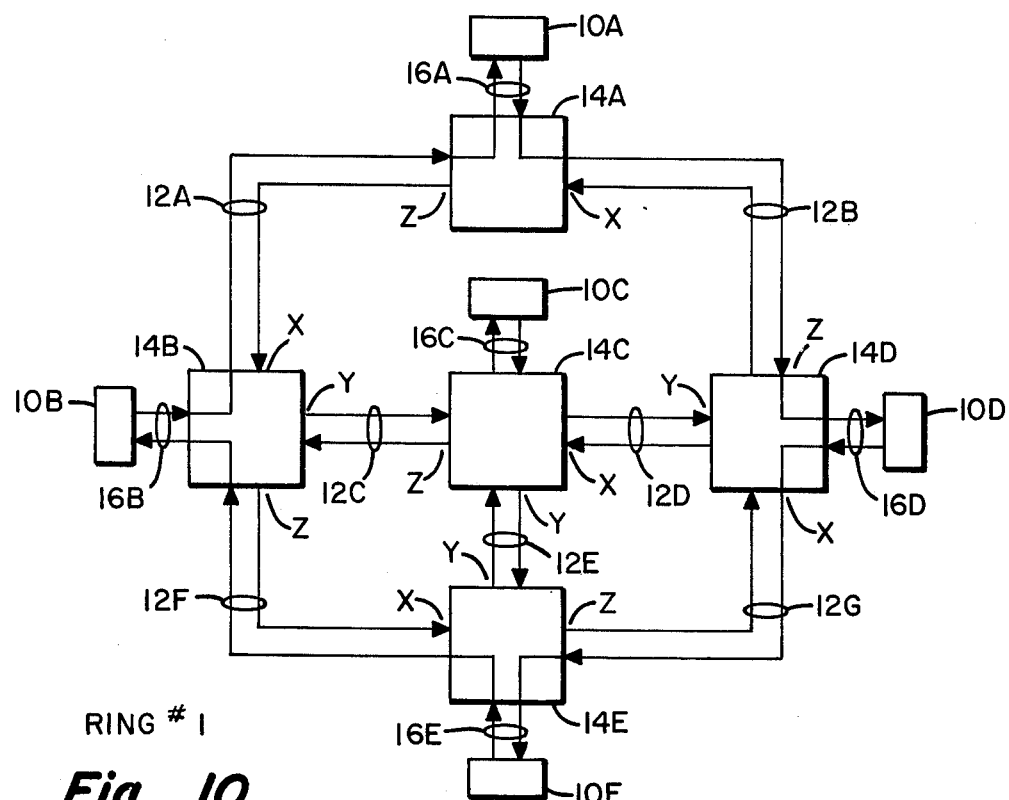
FIGS. 10 and 11 illustrate reconfiguration into various ring networks.

A simple ring or loop bus structure is illustrated in FIG. 10. In this configuration, digital nodal communication devices 10A, 10B, 10D and 10E are all interconnected on a single one-way loop. To accomplish this result, RDB modules 14A, 14B, 14D, and 14E are all connected in the same manner. In each of these RDB modules 14, the inbound portion of the interface bus 16 is connected to the outbound portion of port X and the inbound portion of port Z is connected to the outbound portion of the interface bus 16. This creates a single communication one-way clockwise loop with each digital nodal communication device 10 inserted in the loop by way of a digital RDB module 14.

The illustrated loop bus structure allows communication between any two digital nodal communication devices 10 by way of any digital nodal communication devices located between them. This configuration is described because one of the digital nodal communication devices 10 in the loop must break the chain. It is not within the scope of the present invention to demonstrate which device should perform that function. Hence, the communication loop is shown to go through all of the digital nodal communication devices 10 located on the loop. It is envisioned, however, that a loop structured bus configuration could be established with a connection directly through the RDB modules 14 in addition to being connected to the appropriate digital nodal communication device 10 by way of the interface bus 16. For example, in loop structure illustrated in FIG. 10, the above connection would be made in RDB module 14E by connecting the inbound portion of port Z with the outbound portion of port X in addition to the connections which are already illustrated. Of course, one of the RDB modules 14 on the loop would have to be open between bus ports in order to allow for the loop to be broken.

Figure 11:
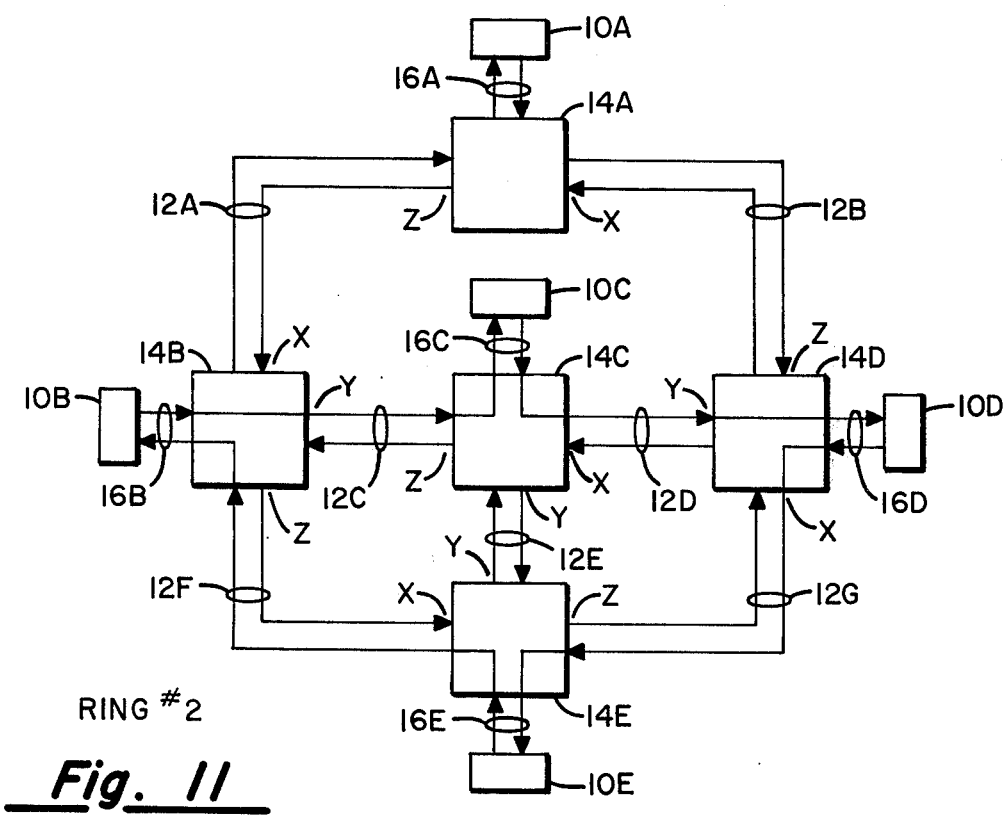

Various other ring or loop bus structures may also be constructed. FIG. 11 illustrates a single loop bus structure connecting digital nodal communication devices 10B, 10C, 10D and 10E. The internal connections in the RDB modules 14B, 14C, 14D and 14E are very similar to those explained in the first ring or loop thus structure described in FIG. 10. The connections in RDB modules 14C and 14E are identical, while the connections in RDB module 14B utilize communication ports Y and Z instead of X and Z, respectively, and the connections in RDB module 14D utilize communication ports X and Y instead of X and Z, respectively.

In addition, combination loop an tree bus structures may be developed by combining the techniques described above. From the example communication system given, a multitude of different, unique bus structures may be developed utilizing the RDB modules 14. The illustrative dedicated channel, tree and ring structures given are but mere examples of all of the bus structures possible.

Thus, it can be seen that there has been shown and described a novel apparatus facilitating the electrical reconfiguration of data bus structures without modification of the physical digital data bus. It is to be understood, however, that various changes, modifications and substitutions in the form and details of the described apparatus can be made by those skilled in the art without departing from the scope of the invention as defined by the following claims.

I claim:

1. A reconfigurable data bus transmission system for electrically reconfiguring the data bus structure established by the physical interconnections of a network of physically fixed digital data buses interconnecting a plurality of digital nodal communication devices, comprising in combination:
   A. a plurality of digital data buses;
   B. a plurality of digital nodal communication devices adapted to be coupled to selected ones of said digital data buses;
   C. a plurality of digital reconfigurable data bus modules, one for each of said plurality of digital nodal communication devices, adapted to be connected intermediate to said digital data buses and said digital nodal communication devices, each of said digital reconfigurable data bus modules including:
      a. at least one set of bus communication ports capable of receiving and transmitting digital information to and from said digital data buses,
      b. a set of device communication ports capable of digital data communication to and from said digital nodal communication device, and
      c. a switching means capable of the simultaneous and independent establishment of a plurality of connections, each of said connections consisting of the switching of data between at least one of said set of bus communication ports and said set of device communication ports.

2. A communication system as in claim 1 wherein said switching means comprises a digital electronic matrix, consisting of $n$ inputs and $n$ outputs, said matrix including:
   A. a logical "AND"ing means located at each row and column juncture in said digital electronic matrix;
   B. means for associating one of the said $n$ inputs with each of the rows in the said digital electronic matrix;
   C. means for associating one of the said $n$ outputs with each of the columns in the said digital electronic matrix;
   D. means for connecting each of the said $n$ inputs to all of the said logical "AND"ing means in the row with which each particular input is associated;
   E. means for individually connecting all of the said "AND"ing means in the said digital electronic matrix to a separate control means;
   F. means for collecting the output of all of the said logical "AND"ing means in a given column into a logical "OR"ing means such that a signal present at the output of any of the said logical "AND"ing means in said column will cause a signal to be present at the output of the said logical "OR"ing means for said column; and
   G. means for individually connecting the output of the said logical "OR"ing means for each column to the said output associated with that particular column.

3. A communication system as in claim 2 where said control means comprises:
   A. a series of $n$ latches each having $n$ bits;
   B. means for associating one of the said latches for each of the columns in the said digital electronic matrix;
   C. for all of the said $n$ bits in each latch means connecting the output of said latch to the said logical "AND"ing means in the column associated with said latch, and
   D. means for loading each latch.

4. A communication system as in claim 1 where said switching means comprises a matrix consisting of $n$ inputs and $n$ outputs, said matrix including:
   A. $n^2$ logical AND gates, each having a single output and first and second input, said gates being agreeable in $n$ columns and $n$ rows;
   B. for all of the said $n$ rows, means connecting one of the said $n$ inputs directly to said first input of every said logical AND gate in said row;
   C. for all of the said $n$ columns, means connecting the said second input of all of the logical AND gates individually to a controlling means;
   D. for all of the said $n$ columns, means connecting the output of each of the said logical AND gates in said column to a separate "OR"ing means whereby a signal present at the output of any one of the said logical AND gates in said column will cause a signal to be present at the output of the "OR"ing means for said column, and
   E. means individually connecting the output of each of the said "OR"ing means to a different one of the said $n$ outputs.

5. A communication system as in claim 4 wherein said "OR"ing means comprises:
   A. a series of $(n-1)$ logical OR gates having a single output and first and second inputs;
   B. means coupling the said first input of a first of said logical OR gates to the output of a first of said logical AND gates;
   C. means coupling the said second input of said first logical OR gate to the output of a second of said logical AND gates;
   D. means connecting the output of said first, and all subsequent, logical OR gates to said first input of the next said logical OR gate until $(n-1)$ of the said logical OR gates are utilized;
   E. means connecting the output of a third, and all subsequent, logical AND gate to the said second input of the second, and all subsequent, of said logical OR gates; and
   F. the output of the $(n-1)$'th logical OR gate being the output of said "OR"ing means.

6. A communication system as in claim 4 where said "OR"ing means comprises:
   A. a logical OR great having a single output and $n$ inputs;
   B. for all of the said $n$ logical AND gates, means for connecting the said output of one of the said logical AND gates to the $n$'th input of the said logical OR gate; and
   C. the output of said logical OR gate being the output of said "OR"ing means.

7. A communication system as in claim 4 where said "OR"ing means comprises means for connecting the said output of all of the $n$ said logical AND gates to a single electrical point thereby creating a "wired-OR" configuration, said single electrical point also being the output of said "OR"ing means.

8. A communication system as in claim 4 where said controlling means comprises:
   A. a latch having $n$ bits;
   B. for all of the said $n$ bits, means connecting the output of said latch to the said second input of the $n$'th said logical AND gate located in said column; and
   C. means for loading said latch.

* * * * *

UNITED STATES PATENT AND TRADEMARK OFFICE
CERTIFICATE OF CORRECTION

PATENT NO. : 4,032,893
DATED : June 28, 1977
INVENTOR(S) : Donald Martin Moran

It is certified that error appears in the above-identified patent and that said Letters Patent are hereby corrected as shown below:

Column 11, Line 48, "second input," should be --second inputs,--.

Column 12, Line 11, "wherein" should be --where--.

Column 12, Line 33, "great" should be --gate--.

Signed and Sealed this

Twentieth Day of September 1977

[SEAL]

Attest:

RUTH C. MASON
Attesting Officer

LUTRELLE F. PARKER
Acting Commissioner of Patents and Trademarks